Patented Mar. 29, 1932

1,851,033

UNITED STATES PATENT OFFICE

GIAN ALBERTO BLANC, OF ROME, ITALY

METHOD FOR THE REMOVAL OF COLLOIDAL SILICA FROM MIXED SOLUTIONS OBTAINED DURING THE TREATMENT OF SILICATES WITH ACIDS

No Drawing. Application filed August 16, 1930, Serial No. 475,842, and in Italy August 23, 1929.

The difficulty met with in industrial practice for eliminating a colloidal substance present in a solution is well known. Such for example is the colloidal silica which may be present in a liquid either in the form of sol or in the form of gel.

In fact, in the case in which the colloid is present in a state of gelatinous aggregate, the filters become choked, and when the silica is present in a highly dispersed state, it passes through the filtering material thus contaminating the filtered liquid.

A process is known which has formed the object of a previous Patent No. 1,443,674 issued January 30, 1928, to the applicant, by means of which in the treatment with acids of complex silicates, as for example leucite, saline solutions are obtained practically free from silica.

An accurate investigation of the physicochemical phenomena accompanying the attack by acids, has allowed applicant to ascertain the fact that the solid siliceous residue obtained from some of them, as for example the leucite, has the property to retain the colloidal silica contained in suspension in a liquid with which the said residue may come in contact. The importance of this discovery made by applicant consists in the fact that it allows of an application enabling the useful utilization of materials which up to the present had not been utilized or had only a very scarce utilization.

It is known for example that silicates in general and particularly some silicates containing materials which may assume a very high value if obtained without silica (such for example alumina obtained from leucite) can be, as mentioned hereinbefore, treated with acids, thus obtaining a practically complete elimination of the silica from the saline solution from which the required materials are to be separated. However, in the process just mentioned, for which Letters Patent have been granted to applicant, the whole mineral used in the process or almost the whole mineral must be in a granular state which condition necessitates a special treatment for the mechanical preparation of the said material, during which preparation a considerable quantity of powder or material too small to be used in the said process is produced, as the process requires the use of grains of mineral the size of which must not go under certain limits which may be relatively large when using certain acids. In addition, the attack of the mineral in the granular form by the acid is much slower and difficult than when a fine or powdered material is used.

From the above it is obvious that a method for the elimination of colloidal silica present in the solutions obtained by the treatment of a silicate (such as leucite) in powdered form with various acids is of considerable industrial importance. The method which applicant has found after a long series of researches and experiments is as follows:

A certain quantity of the siliceous residue, remaining after attacking with acid a silicate in granular form (as for example the leucite) and after eliminating the resulting saline solution (which of course can be utilized) is placed into a container which has a perforated bottom, so as to form a permeable layer through which is passed the liquor to be freed from the colloidal silica which it holds in suspension.

The absorbing capacity of this layer for colloidal silica being very great, it can deal with very considerable quantities of liquor containing colloidal silica, which are obtained from the attack of silicates (for example leucite) totally or mostly in powder form, which could not otherwise be utilized without this method.

Another way of applying the process is to treat the mixed material, viz, silicate in granular and in powdered form, assuming a medium limit of fineness of the said material, so that the open spaces, and consequently the permeability of the layer of material to be attacked are sufficient to allow the liquid to pass through it, so that the said liquid, when the attack has been completed, may pass through the mass of the siliceous residue, which in this way will retain the colloidal silica suspended in the liquid.

Applicant has also ascertained that the main factors influencing the rapidity of fixation of the colloid in suspension are the saline and acid concentration of the liquor and its temperature, the rapidity increasing with the increase of the said factors.

It is therefore possible for each silicate, for each size of the grains and for each acid used, to choose the most convenient degree of acidity, of saline concentration as well as the most suitable temperature for eliminating the silica by the method above described, without the risk of reaching the limit of saturation of the solution for any one of its saline constituents.

The method above described for eliminating colloidal silica from a solution in which it is held in suspension, can also be applied for separating other colloidal substances in the state of suspension which can be fixed by passing the liquid through a granular and therefore permeable mass of colloid which will operate in a similar way as the residue of the attack of granulated leucite with acids.

I claim:

1. The process of eliminating the colloidal silica held in suspension in the solution obtained by the treatment of finely powdered silicates with acids, comprising passing said solution through a filtering layer formed of the same silicates in a granular state which has previously been treated repeatedly with acid so as to extract from it the soluble bases.

2. The process as specified in claim 1, in which for the purpose of accelerating and facilitating the effective action of the filtering layer on the colloidal silica held in solution the latter is heated and its concentration increased by the addition to it of fresh acid and salts of any of its saline constituents.

In testimony whereof I have affixed my signature this fifth day of August, 1930.

GIAN ALBERTO BLANC.